United States Patent [19]

Skeem

[11] 4,390,312
[45] Jun. 28, 1983

[54] ROUND BALE TRANSPORTER AND FEEDER

[76] Inventor: Wayne B. Skeem, 1742 Targhee Dr., Twin Falls, Id. 83301

[21] Appl. No.: 237,088

[22] Filed: Feb. 23, 1981

[51] Int. Cl.³ .................... A01D 90/12; B60P 1/02
[52] U.S. Cl. .................... 414/24.6; 198/516; 241/101 A; 414/911
[58] Field of Search ............... 414/24.5, 24.6, 911; 241/101.2, 101 A, 200; 242/86.5 R, 86.5 Z; 100/211, 212; 19/80 R; 198/516

[56] References Cited

U.S. PATENT DOCUMENTS

| | | | |
|---|---|---|---|
| 3,779,208 | 12/1973 | Gay | 119/1 |
| 3,877,595 | 4/1975 | Edelman | 214/506 |
| 3,896,956 | 7/1975 | Hostetler | 214/501 |
| 3,924,765 | 12/1975 | Hostetler | 214/518 |
| 3,999,674 | 12/1976 | Meitl | 414/24.5 |
| 4,042,140 | 8/1977 | McFarland | 214/518 |
| 4,044,967 | 8/1977 | Guichon | 242/86.5 R |
| 4,062,454 | 12/1977 | Priefert | 214/1 HH |
| 4,072,241 | 2/1978 | Parker et al. | 214/392 |
| 4,078,733 | 3/1978 | Popiolek | 414/24.6 |
| 4,088,272 | 5/1978 | Grillot | 241/30 |
| 4,094,428 | 6/1978 | White et al. | 214/505 |
| 4,103,794 | 8/1978 | Shaw | 214/518 |
| 4,126,234 | 11/1978 | Wells | 214/1 HH |
| 4,161,253 | 7/1979 | Ralston et al. | 414/25 |
| 4,195,958 | 4/1980 | Vahlkamp et al. | 414/24.6 |
| 4,204,789 | 5/1980 | Parks, Jr. | 414/24.5 |
| 4,204,790 | 5/1980 | Baxter | 414/24.5 |
| 4,248,560 | 2/1981 | Roose | 414/24.5 |
| 4,266,898 | 5/1981 | Jacobsen et al. | 414/24.5 |

FOREIGN PATENT DOCUMENTS 2371868   7/1978   France ................. 414/24.6

OTHER PUBLICATIONS

Barbara Cothern, *Buhl Herald*, Mar. 31, 1977, p. 10, Sec. B.

*Primary Examiner*—Robert J. Spar
*Assistant Examiner*—Janice Krizek
*Attorney, Agent, or Firm*—Roylance, Abrams, Berdo & Farley

[57] ABSTRACT

A spirally wrapped, round bale transporter and feeder comprising a support frame having first and second ends and including a pair of bale-supporting members; an assembly for coupling the frame to a wheeled vehicle; a plurality of wheels coupled to the frame; a power assembly for raising and lowering the frame relative to the wheels to load bales onto the frame and unload bales from the frame; and a feeding assembly at the second end of the frame for spirally unwrapping and feeding bales transversely of the frame onto the ground. The wheels are pivotally coupled to the frame substantially centrally thereof. The feeding assembly comprises a pair of endless conveyors having bale-gripping fingers and being pivotally coupled to the frame and movable between a stowed position outboard of the bale-supporting members and a feeding position inboard of these members.

13 Claims, 7 Drawing Figures

ROUND BALE TRANSPORTER AND FEEDER

FIELD OF THE INVENTION

The present invention relates to a transporter and feeder for spirally wrapped, round bales of fibrous material, such as hay. The transporter and feeder has a frame which is coupled to the rear of a wheeled vehicle, such as a tractor, and is supported by a plurality of wheels pivotally coupled thereto. A power assembly can raise and lower the frame relative to the wheels to load and unload the bales. A feeding assembly at an end of the frame spirally unwraps and feeds a bale transversely of the frame onto the ground.

BACKGROUND OF THE INVENTION

In recent years, the typical rectangular bale of hay has been steadily replaced by spirally wrapped round or cylindrical bales, which do not require as much of the costly binding materials and precision forming machinery that the rectangular bales require. However, these round bales are much heavier than the traditional rectangular bales and therefore require strong and durable machines to transport and feed them. Typically, these large round bales are transported to storage during the summer and are then transported in the winter from the storage area for access by the animals which feed upon the hay.

While there are many prior art devices which relate to transporting and feeding such large round bales, they have numerous disadvantages. For example, many of these prior art devices are not easily maneuverable, are very complicated and costly to manufacture and are not durable. Moreover, many of these prior art devices are not versatile since they merely are capable of either transporting or feeding the round bales but not both. Some of these devices can handle only one or two bales at a time, do not self-load and use brute force to tear and shred the bales, all resulting in an inefficient use of fuel.

Examples of such prior art devices are found in the following U.S. patents:

U.S. Pat. No. 3,779,208—Gay
U.S. Pat. No. 3,877,595—Edelman
U.S. Pat. No. 3,896,956—Hostetler
U.S. Pat. No. 3,924,765—Hostetler
U.S. Pat. No. 4,042,140—McFarland
U.S. Pat. No. 4,044,967—Guichon
U.S. Pat. No. 4,062,454—Priefert
U.S. Pat. No. 4,072,241—Parker et al.
U.S. Pat. No. 4,094,428—White et al.
U.S. Pat. No. 4,103,794—Shaw
U.S. Pat. No. 4,126,234—Wells
U.S. Pat. No. 4,161,253—Ralston et al.
U.S. Pat. No. 4,195,958—Vahlkamp et al.
U.S. Pat. No. 4,204,789—Parks, Jr.
U.S. Pat. No. 4,204,790—Baxter In addition, French Pat. No. 2,271,868 to Rabaud discloses a round bale handling machine.

SUMMARY

Accordingly, a primary object of the present invention is to provide an improved transporter and feeder of spirally wrapped round bales of fibrous material, such as hay.

Another object of the present invention is to provide such a transporter and feeder that is easily maneuverable, simple and inexpensive to manufacture and durable and that can feed consecutive bales without the use of additional machinery and without returning to the storage area until all the bales are fed.

Another object of the present invention is to provide such a transporter and feeder that is versatile so that it can transport a plurality of bales and accurately feed them in the desired location.

Another object of the present invention is to provide such a transporter and feeder that will spirally unwrap a round bale along its preformed spiral, thereby saving fuel and minimizing separation of the hay leaves from the stems.

The foregoing objects are basically attained by providing a spirally wrapped round bale transporter and feeder driven by a wheeled vehicle, the combination comprising a support frame having first and second ends and including a pair of spaced, parallel bale-supporting members; an assembly, located adjacent the second end of the support frame for coupling the frame to the vehicle; a plurality of wheels; an assembly for coupling the wheels to the support frame; a power assembly, coupled to the assembly for coupling the wheels to the frame, for raising and lowering the support frame relative to the wheels to load bales onto the frame and unload bales from the frame; and a feeding assembly, coupled to the support frame adjacent the second end, for spirally unwrapping and feeding a round bale supported on the bale-supporting members adjacent the second end transversely of the frame and onto the ground.

Advantageously, the wheels are pivotally coupled to the frame substantially centrally thereof and the power assembly comprises a hydraulic power device to raise and lower the frame relative to the wheels.

The feeding assembly advantageously comprises a pair of endless conveyors having bale-gripping fingers and being pivotally coupled to the frame and movable between a stowed position outboard of the bale-supporting members and a feeding position inboard of these members.

The first end of the support frame is open, while the second end is closed and is pivotally coupled to a wheeled vehicle, such as a tractor.

Other objects, advantages and salient features of the present invention will become apparent from the following detailed description which, taken in conjunction with the annexed drawings, discloses a preferred embodiment of the present invention.

DRAWINGS

Referring now to the drawings which form a part of this original disclosure:

DETAILED DESCRIPTION OF THE INVENTION

Figure 1:
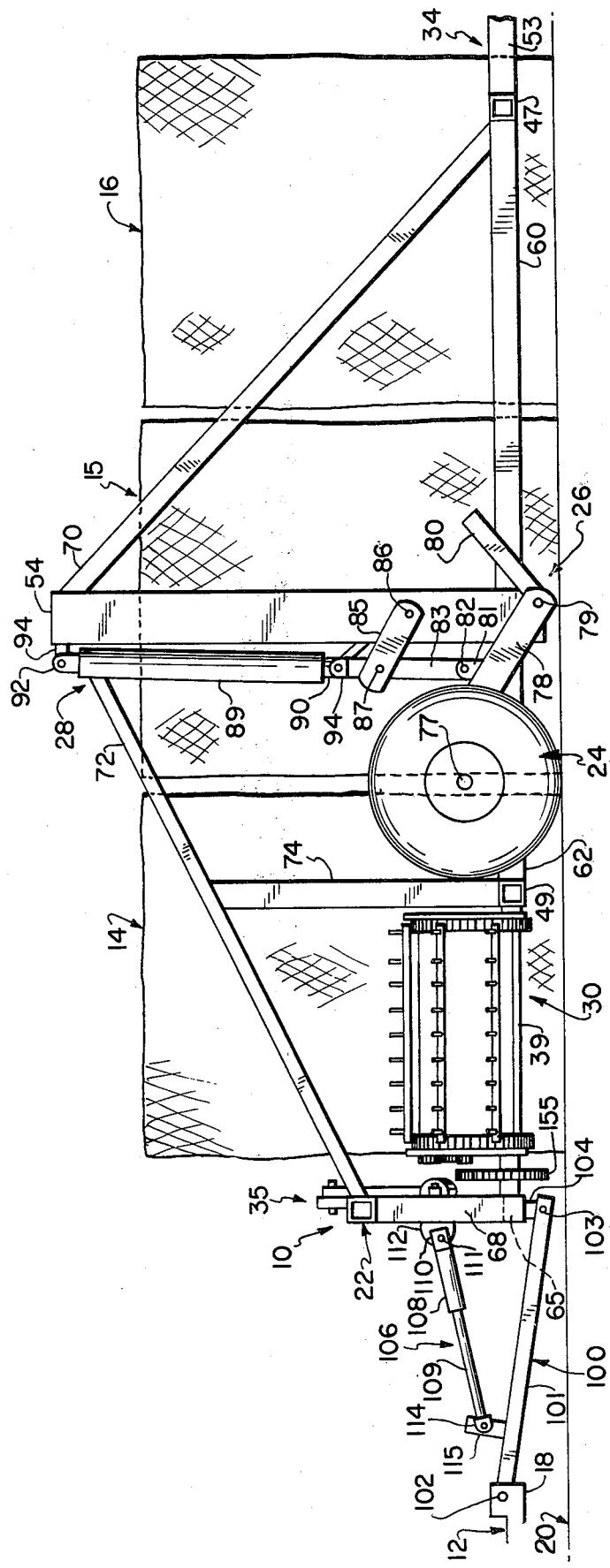
FIG. 1 is a side elevational view of the transporter and feeder in accordance with the present invention in the lowered position and carrying three spirally wrapped round bales, the feeding assemblies being in their stowed position.

As seen in FIGS. 1-4, the transporter and feeder 10 in accordance with the present invention is driven by a wheeled vehicle, such as a tractor 12, and is capable of transporting and feeding a plurality of spirally wrapped round bales of fibrous material such as hay. As seen in FIG. 1, there are three bales 14, 15 and 16 carried by the transporter and feeder, but this number can be increased or decreased depending on the size of the apparatus.

Figure 2:
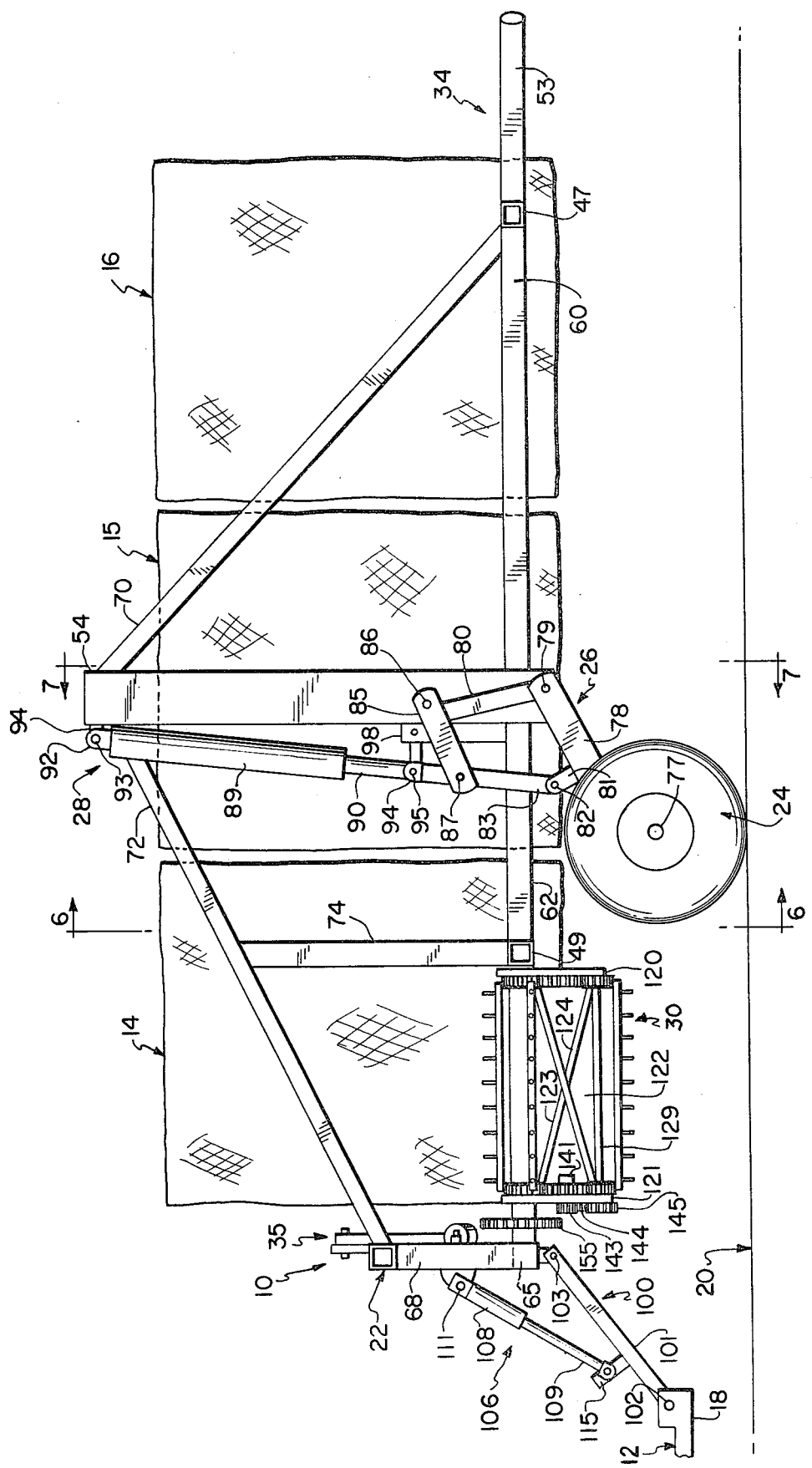
FIG. 2 is a side elevational view similar to that shown in FIG. 1 except that the transporter and feeder is in the raised position and the feeding assemblies have been pivoted to their feeding position.
Figure 4:
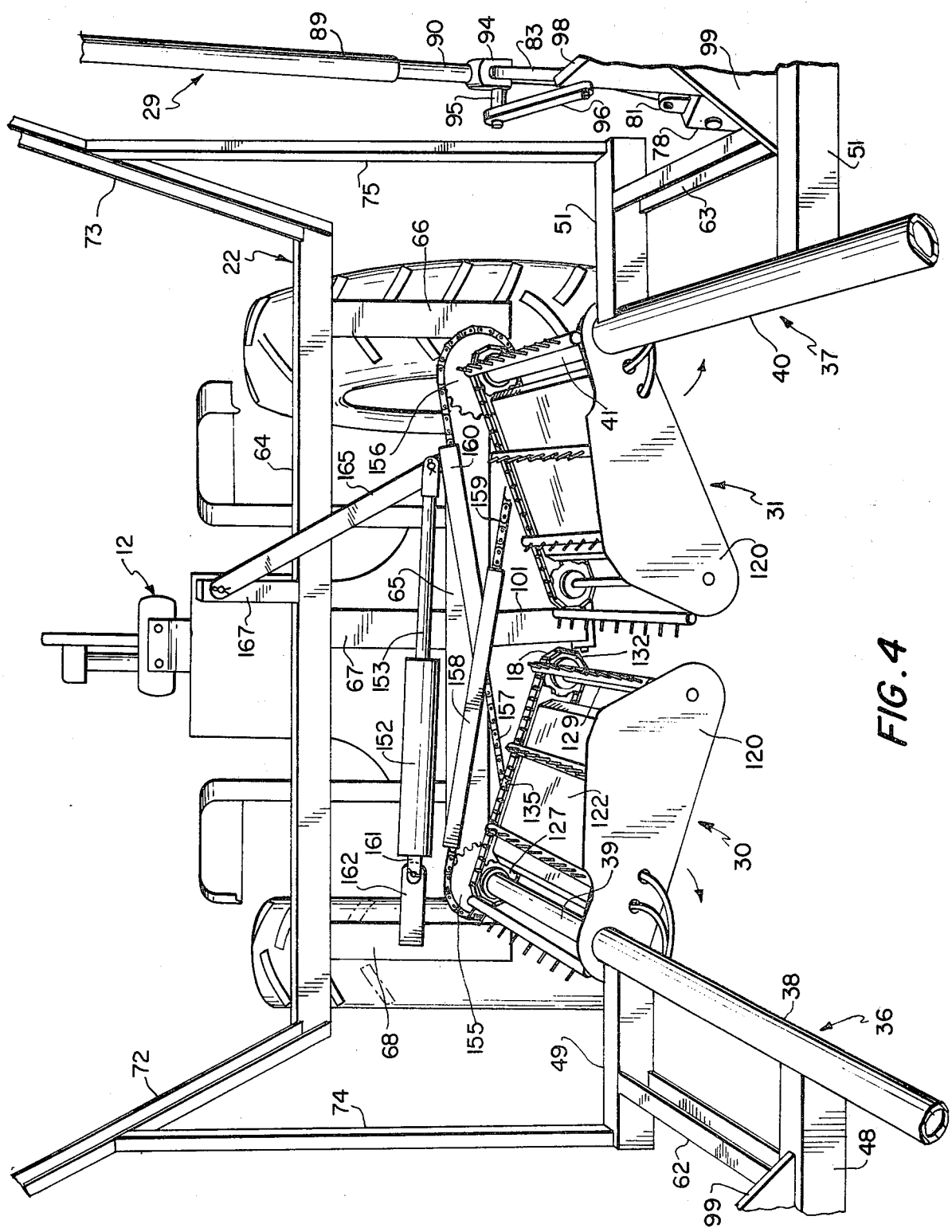
FIG. 4 is an elevational view in section taken along lines 4—4 in FIG. 3 showing the feeding assemblies in their feeding position.

As best seen in FIG. 4, the tractor 12 has a hitch 18 coupling the transporter and feeder thereto for movement of the transporter and feeder over the ground indicated by reference numeral 20 in FIGS. 1 and 2.

Figure 7:
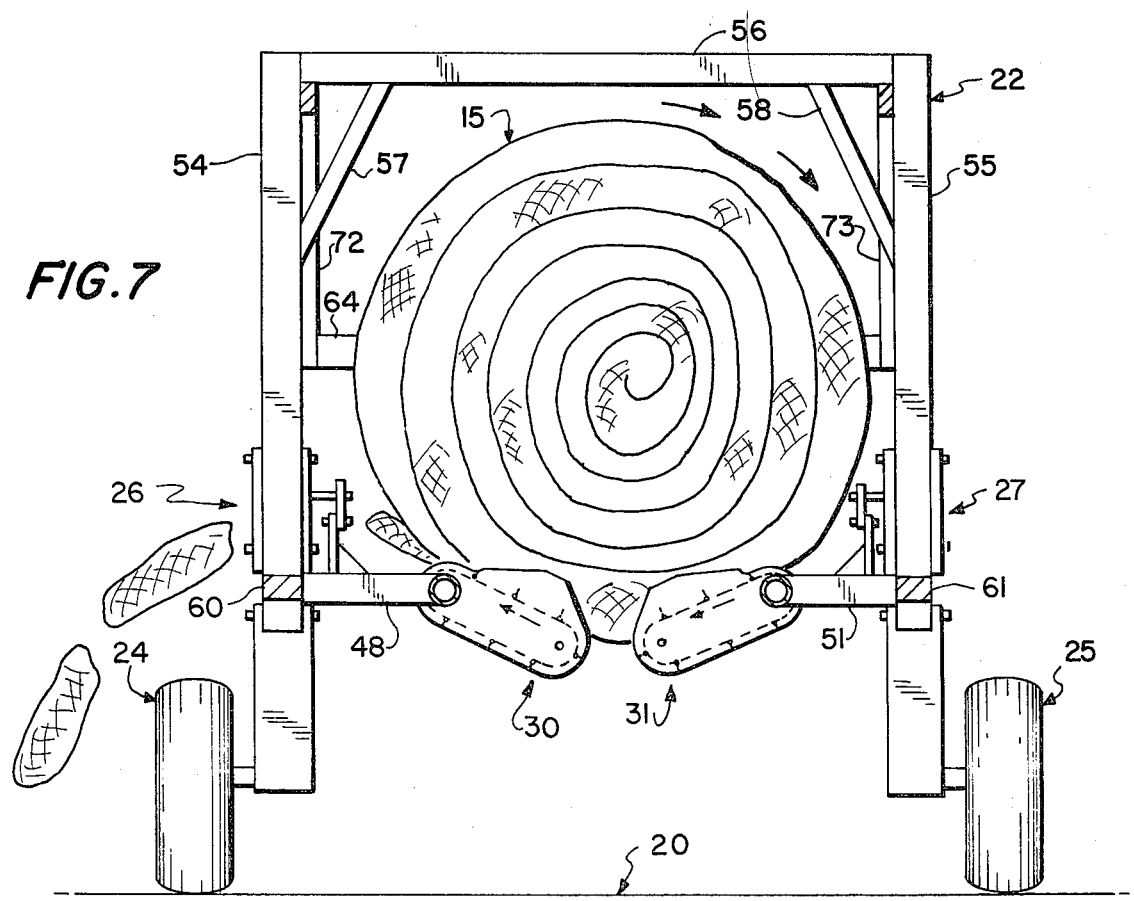
FIG. 7 is an elevational view in section taken along lines 7—7 in FIG. 2 showing a bale being spirally unwrapped and fed transversely of the rails and onto the ground.

As seen in FIGS. 1-4, the transporter and feeder 10 is comprised of a support frame 22, a pair of wheels 24 and 25 substantially centrally located on the frame, a pair of coupling assemblies 26 and 27 pivotally coupling the wheels to the support frame, a pair of power assemblies 28 and 29 for raising and lowering the support frame relative to the wheels, and a pair of feeding assemblies 30 and 31 for spirally unwrapping and feeding the round bale transversely of the support frame and onto the ground, as seen in FIG. 7.

Figure 3:
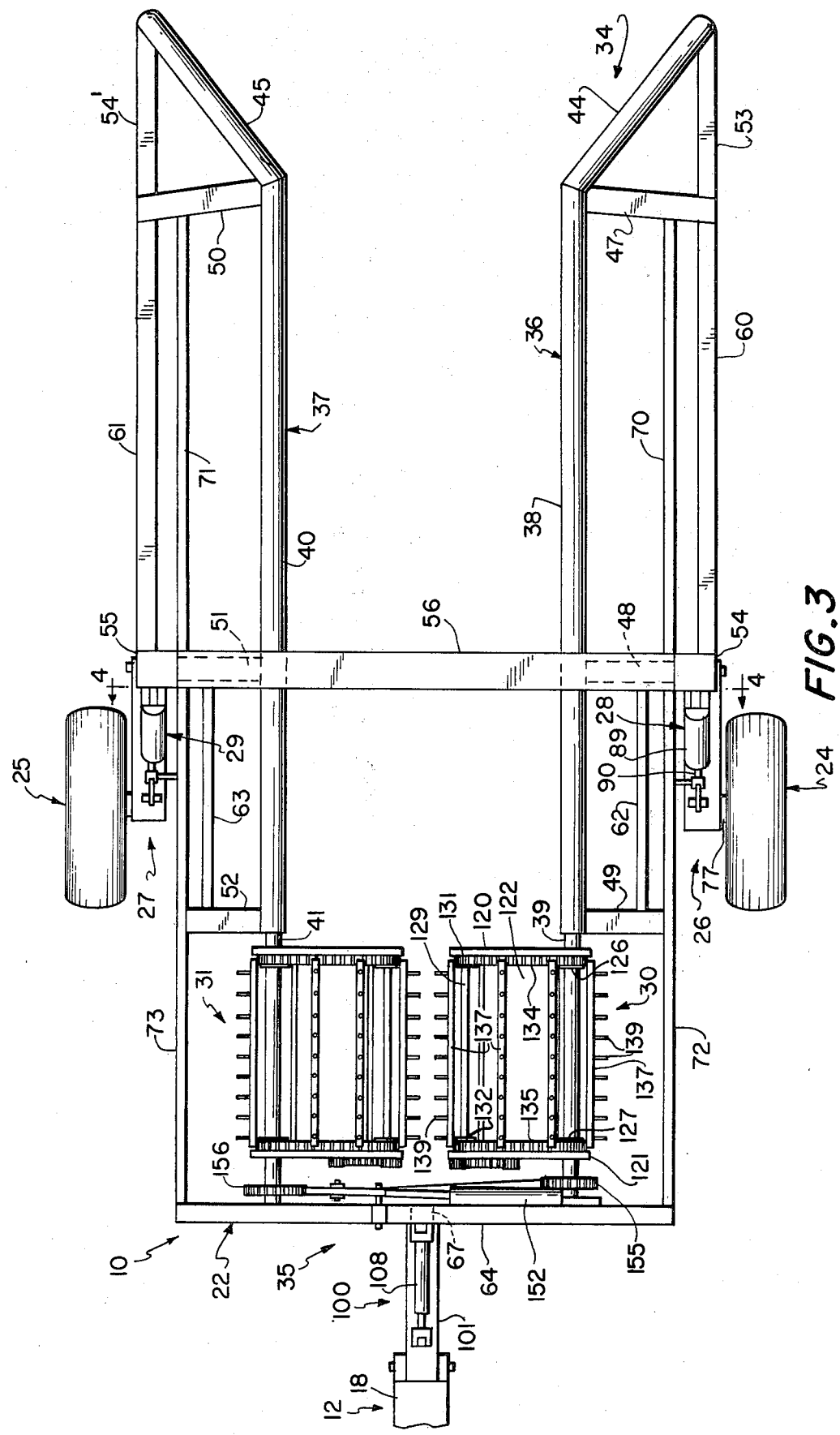
FIG. 3 is a top plan view of the transporter and feeder without bales thereon, the feeding assemblies being in their feeding position.
Figure 6:
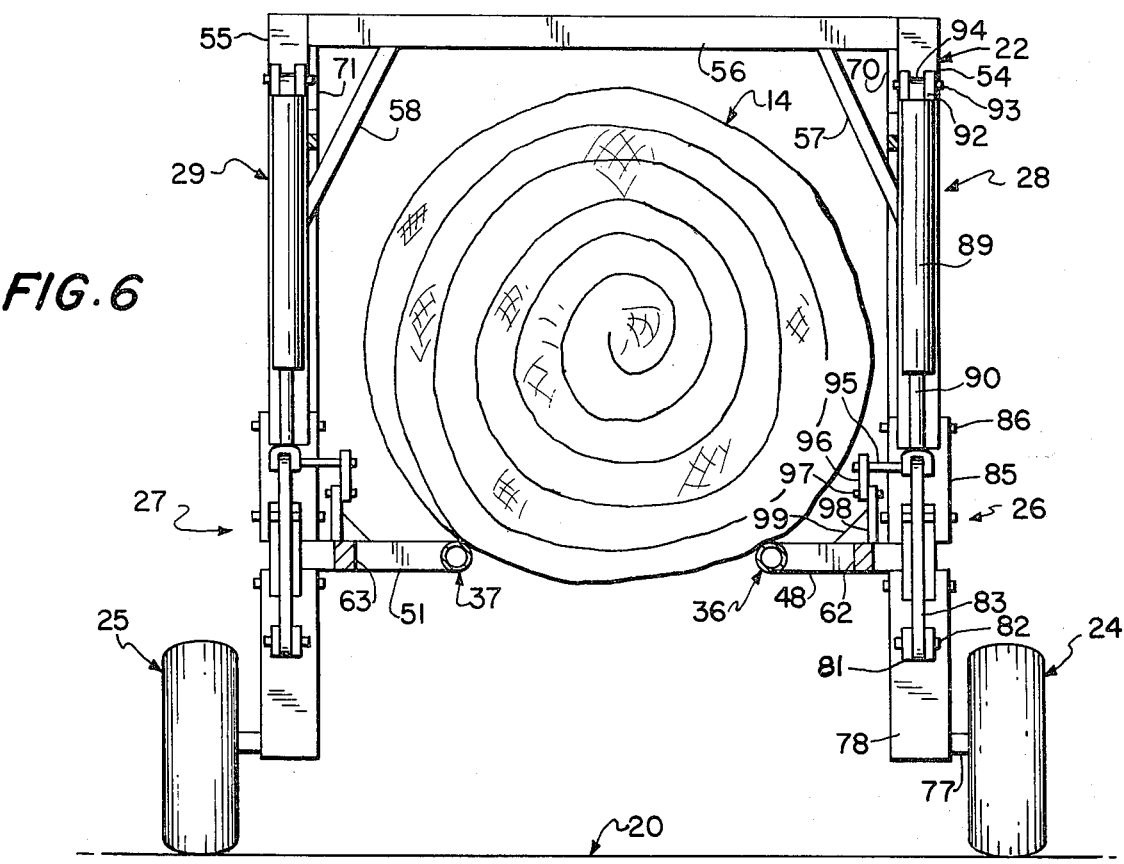
FIG. 6 is an elevational view in section taken along lines 6—6 in FIG. 2 showing how the bales are supported on the rails of the support frame.

As best seen in FIGS. 1, 3 and 6, the support frame 22 has a first open end 34 and a second closed end 35 adjacent hitch 18 of tractor 12. Extending longitudinally of the support frame from the first open end 34 to the second closed end 35 are a pair of bale-supporting members 36 and 37. As seen in FIG. 3, member 36 is formed from a first cylindrical rail 38 and a second cylindrical rail or shaft 39, the second rail 39 being rotatably received inside a hollow end of rail 38 and also rotatably received in the support frame 22 at the second end 35. Similarly, the other bale-supporting member 37 is comprised of a first rail 40 and a second rail or shaft 41 similarly mounted.

Extending transversely outward from the ends of rails 38 and 40 are two cylindrical end members 44 and 45, these members being rigidly coupled, such as by welding, respectively, to rails 38 and 40. Extending outwardly from rail 36 are three horizontally oriented transverse beams 47, 48 and 49, best seen in FIG. 3. These three beams are rigidly coupled to rail 38, such as by welding, and are preferably rectangular in cross-section and tubular. A similar set of three horizontally oriented beams 50, 51 and 52 extend outwardly from the opposite rail 40.

Extending longitudinally between the distal ends of and rigidly coupled to end member 44 and beam 47 is a horizontally oriented support beam 53. Similarly rigidly coupled between the distal ends of end member 45 and beam 50 is support beam 54'.

Extending vertically upward and rigidly from beams 48 and 51 are two support members 54 and 55 which are coupled together at their tops, as seen in FIG. 6 by a horizontally oriented support member 56. These members 54–56 are advantageously rectangular in cross-section and tubular. As seen in FIG. 6, two diagonal struts 57 and 58 are rigidly secured respectively between members 54 and 56 and members 55 and 56.

Extending rigidly between the distal end of beam 47 and the lower end of support member 54 is a horizontally oriented beam 60. A similar beam 61 extends rigidly between the distal end of beam 50 and support member 55. A horizontally oriented beam 62 is rigidly secured between beams 48 and 49 and a similar horizontally oriented beam 63 extends rigidly between beams 51 and 52 on the other side of the support frame 22.

At the second end 35 of the support frame, as best seen in FIG. 4, are an upper horizontal beam 64 and a lower horizontal beam 65 rigidly coupled via three spaced vertical posts 66–68.

As best seen in FIGS. 1 and 3, a diagonal strut 70 is rigidly secured between the top of support member 54 and beam 47 and a similar diagonal strut 71 is rigidly secured between the top of support member 55 and beam 50. Another diagonal strut 72 is rigidly secured between the top of support member 54 and upper horizontal beam 64 at the second end of the frame and a similar diagonal strut 73 is rigidly coupled between the top of support member 55 and the other side of upper horizontal beam 64.

As best seen in FIG. 4, a vertical post 74 is rigidly coupled between the top of beam 49 and the bottom of diagonal strut 72 and a similar vertical post 75 is rigidly coupled between beam 51 and diagonal strut 73.

Referring now to FIGS. 2, 3 and 6, it is seen that each of the coupling assemblies 26 and 27 for pivotally coupling the wheels 24 and 25 to the frame 22 are the same and therefore only one will be described in detail. Thus, coupling assembly 26 for wheel 24 includes a wheel shaft 77 rotatably coupled to a lower pivot arm 78 which is in turn pivotally coupled via pivot rod 79 received in suitable apertures in vertical support member 54. Rigidly coupled at the end of the lower pivot arm 78 is a support bar 80 extending at an angle slightly greater than 90° from the longitudinal axis of pivot arm 78. A clevis 81 is formed on the upper surface of pivot arm 78 and pivotally supports a bar 83 via pivot rod 82 received in an aperture in the bar 83.

An upper pivot arm 85 is pivotally supported via pivot rod 86 on vertical support member 54 in suitable apertures and has a pivot rod 87 at its distal end for pivotally coupling bar 83 thereto via suitable bores in the bar and the arm. These members can be so proportioned if desired to lock "over the center" in the fully raised position.

Figure 5:
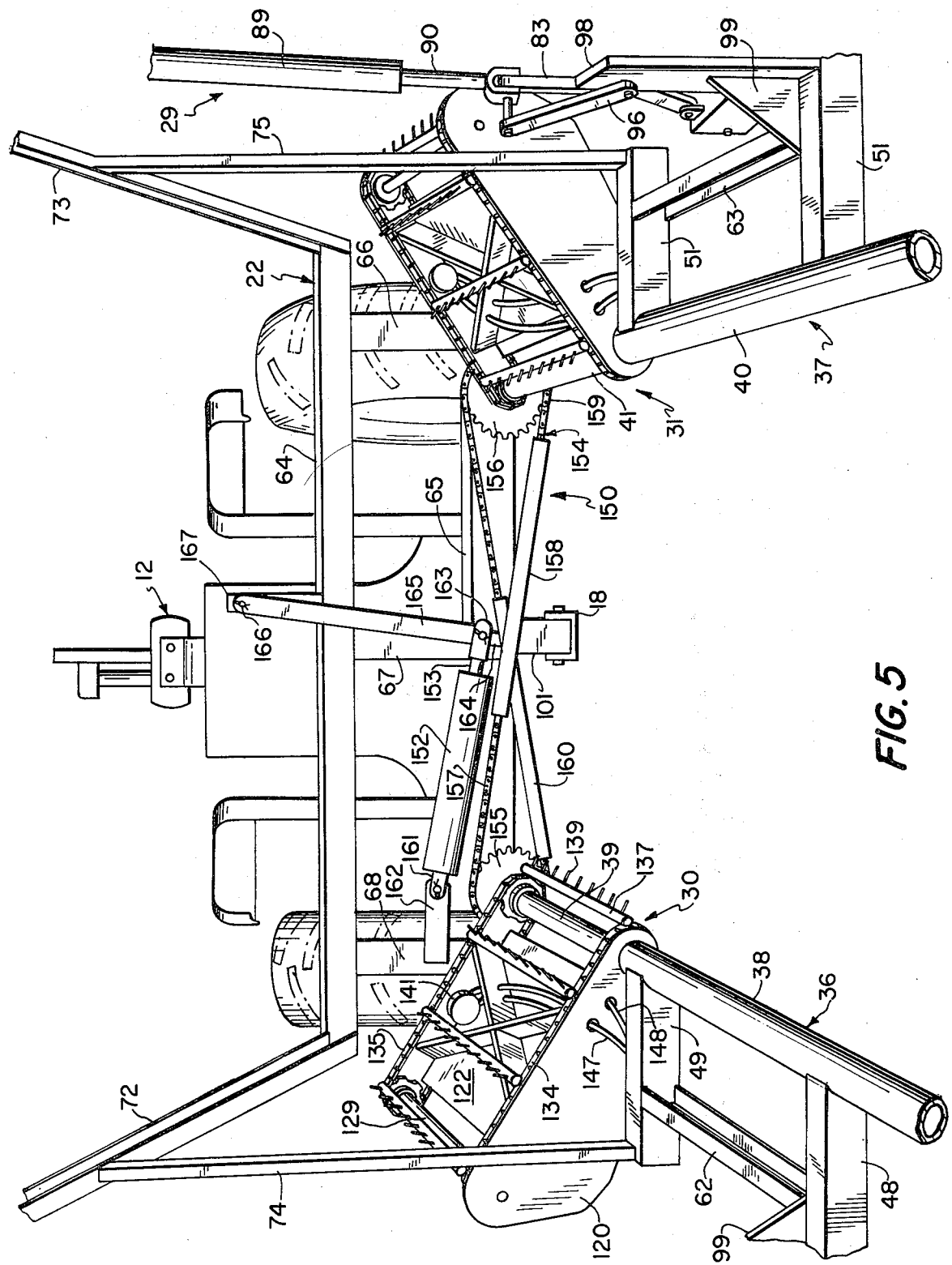
FIG. 5 is an elevational view in section similar to that shown in FIG. 4 except that the feeding assemblies have been pivoted outwardly into their stowed position.

As seen in FIG. 3, the pair of power assemblies 28 and 29 each act on the coupling assemblies 26 and 27, respectively, to pivot the support frame 22 relative to the wheels 24 and 25. In each case, the power assemblies are the same, so only one will be described in detail. Thus, as seen in FIGS. 1, 2 and 3, power assembly 28 is comprised of a hydraulic cylinder 89 and a hydraulic piston shaft 90 extending therefrom and movable relative thereto. At the upper end of hydraulic cylinder 89 is a clevis 92 pivotally supported via rod 93 to a suitably bored plate 94 rigidly coupled to support member 54. At the bottom of shaft 90 is another clevis 94 pivotally connected via rod 95 to a suitable bore in the top of bar 83 extending above upper pivot arm 85. As best seen in FIG. 6, this rod 95 extends inwardly of the frame and is pivotally coupled to a stabilizing bar 96 which is in turn pivotally coupled via rod 97 to a support plate 98 rigidly secured to the top of beam 48. This plate is reinforced by a triangular plate 99 rigidly coupled to plate 98 and beam 48. Some of the details of this are also shown in FIGS. 4 and 5.

As seen in FIGS. 1-3, an additional coupling assembly 100 pivotally couples the second end 35 of the support frame 22 to hitch 18 on the tractor 12. This coupling assembly comprises an elongated rigid arm 101 pivotally coupled at one end via pivot rod 102 to the hitch 18 and at the other end via pivot rod 103 to a plate 104, which is rigidly coupled to the bottom of horizontal lower beam 65. To adjust the pivotal relationship of the second end 35 of the frame relative to the hitch 18 a power device 106 is pivotally coupled to the frame and arm 101. This power device comprises a hydraulic cylinder 108 and a hydraulic piston shaft 109 movable through the cylinder 108. A clevis 110 at the end of cylinder 108 pivotally couples the cylinder via pivot rod 111 to a plate 112 rigidly coupled to vertical post 67, indicated in FIG. 3. A clevis 114 at the end of shaft 109 is pivotally coupled via a suitable rod to plate 115 extending rigidly upward from the top of arm 101.

As seen in FIGS. 1, 2 and 3, the two feeding assemblies 30 and 31 are formed from similar parts and therefore only one will be described in detail. Thus, feeding assembly 30 comprises a front support plate 120, a rear support plate 121, an upper flat base plate 122 rigidly coupled to the support plates and a pair of cross plates 123 and 124 rigidly coupled to the base plate and the opposed support plates. The second rail or shaft 39 extending from rail 38 passes through suitable bores in support plates 120 and 121 and into a suitable bore in lower horizontal beam 65 and rotatably supports two sprockets 126 and 127 adjacent the interior surfaces of support plates 120 and 121. Shaft 39 is rigidly coupled to plates 120 and 121. A second shaft 129 is rotatably mounted in suitable apertures in support plates 120 and 121 at the opposite ends of these plates from shaft 39, shaft 129 rigidly supporting sprockets 131 and 132 adjacent the interior surfaces of opposed support plates 120 and 121.

As seen best in FIG. 3, sprockets 131 and 126 carry an endless chain 134 and sprockets 132 and 127 carry an endless chain 135. Rigidly coupled between chains 134 and 135 are a plurality of tubes 137 having rigid fingers 139 extending perpendicularly therefrom.

As seen in FIG. 2, a hydraulic motor 141 is rigidly secured to support plate 121 and has a shaft extending therethrough into a rigid coupling with a sprocket 143. This sprocket is connected via chain 144 to another sprocket 145, which is in turn rigidly coupled to shaft 129, which passes through plate 121.

Thus, upon activation of hydraulic motor 141, sprocket 143 is rotated, which in turn moves chain 144, resulting in rotation of sprocket 145. This results in rotation of shaft 129 and therefore movement of chains 134 and 135 around feeding assembly 30. Since the tubes 137 and fingers 139 thereon are rigidly coupled to these chains, such movement will feed a round bale supported thereon, as seen in FIGS. 1 and 7.

As seen in FIG. 5, two hydraulic conduits 147 and 148 can extend through support plate 120 to provide hydraulic fluid to hydraulic motor 141. These hydraulic conduits advantageously are coupled to a pump and tank carried by the tractor 12, where the conventional hydraulic controls therefor are located. Similar suitable hydraulic conduits are connected to the two hydraulic cylinders 89 in the power assemblies 28 and 29 as well as hydraulic cylinder 108 in coupling assembly 100.

As shown in FIG. 4, the feeding assemblies 30 and 31 are in their feeding position inboard of the bale-supporting members 36 and 37. In this position, they can contact and feed a bale, via rotation, as indicated in FIG. 7. On the other hand, as seen in FIG. 5, the feeding assemblies 30 and 31 are in their stowed position outboard of the bale-supporting members. This position is utilized during loading and unloading of the bales onto and from the support frame.

In order to pivot the feeding assemblies from their position shown in FIG. 4 to that shown in FIG. 5, a pivot mechanism 150 is utilized, as best seen in FIG. 5. This mechanism comprises a hydraulic cylinder 152, a hydraulic piston shaft 153 slidably received in the cylinder, a chain assembly 154 and two sprockets 155 and 156, each being rigidly secured to one of the shafts 39 and 41 in each of the feeding assemblies 30 and 31. The chain assembly 154 comprises a chain section 157 seen in FIG. 5 carried by sprocket 155, a bar 158 coupled to an end of chain section 157, a second chain section 159 rigidly coupled at the other end of bar 158, and a second bar 160 coupled between chain section 159 and chain section 157. As seen in FIG. 5, chain section 159 is received on sprocket 156 and the entire chain assembly 154 coupled to the two sprockets 155 and 156 is in a criss-cross or figure-eight configuration.

Hydraulic cylinder 152 is pivotally coupled via clevis 161 at its end to a bar 162 rigidly coupled to vertical post 68. At the distal end of shaft 153 another clevis 163 is pivotally coupled to a short arm 164, which in turn is rigidly coupled to the top of the second bar 160. In addition, stabilizing bar 165 is pivotally coupled to clevis 163 at one end and at the other end is pivotally coupled via rod 166 to a vertical post 167 rigidly coupled to the top of upper horizontal beam 64.

Thus, to move the feeding assemblies 30 and 31 from the feeding position shown in FIG. 4, the hydraulic piston shaft 153 is drawn into hydraulic cylinder 152, thereby pulling bar 160 to the left as viewed in FIG. 4. This results in a counter-clockwise rotation of the right hand sprocket 156, as seen in FIG. 4, and a clockwise rotation of the left hand sprocket 155. Since these sprockets are rigidly coupled respectively to shafts 41 and 39 and these shafts are rigidly coupled to the support plates of the feeding assemblies, the feeding assemblies will pivot outwardly as indicated by the two arrows in FIG. 4. The pivoting continues until the feeding assemblies are in their stowed position shown in FIG. 5 outboard of the bale-supporting members 36 and 37.

OPERATION

In order to load a plurality of round bales onto the transporter and feeder 10, as seen in FIG. 1, the feeding assemblies 30 and 31 are pivoted into their stowed position, hydraulic cylinder 106 is activated to lower the second end 35 of the support frame 22 relative to hitch 18 and the hydraulic cylinders 89 in the coupling assemblies 26 and 27 are activated to pivot the wheels 24 and 25 upwardly relative to the frame so that the bale-supporting members 36 and 37 are near the ground 20. Then, the tractor 12 is activated to move the bale-supporting members under the outer edges of the lower parts of the three bales shown in FIG. 1 already aligned. These bales are received between the two bale-supporting members through the first open end 34.

At this time, the hydraulic cylinder 108 in coupling assembly 100 and the two hydraulic cylinders 89 in the coupling assemblies 26 and 27 are activated to raise the support frame 22 above the ground 20 and upwards relative to the wheels 24 and 25. This is shown in FIG. 2 where the upward movement of the support frame 22 lifts the bales above the ground, these bales being supported by the bale-supporting members 36 and 37 as best seen in FIG. 6.

These bales can then be transported to or from a storage area or to or from a feeding area.

To feed the bales from the transporter and feeder 10, the feeding assemblies 30 and 31 are moved to their feeding position and are activated as indicated in FIG. 7 so that the endless conveyors formed by the tubes 137 and chains 134 and 135 are moving in the same direction. The fingers 139 on each of the tubes tend to grip the fibrous material of the bale and rotate the bale as indicated in FIG. 7. Because the bale is formed in a spiral, this rotation will spirally unwrap the bale and feed the ends of the spiral transversely of the frame 22 and onto the ground as the material breaks into pieces, also indicated in FIG. 7. Advantageously, the left hand feeding assembly 30 seen in FIG. 7 is operated at a speed somewhat greater than feeding assembly 31 so as to tend to loosen, shread and pull apart the material in the bale and ease separation. This is accomplished by varying the hydraulic fluid to the hydraulic motor associated with feeding assembly 31 by means of a fluid flow restrictor. When the bale is fed off the other side of the transporter and feeder, a fluid flow restrictor will be used in feeding assembly 30.

When the bale received by the feeding assemblies 30 and 31 is completely unwrapped and fed to the ground, the feeding assemblies 30 and 31 are pivoted to their outboard position, the frame 22 is lowered to the ground and then moved relative to the bales thus resting on the ground until the next in line bale is received adjacent the second end of the frame 22. Then, the frame is elevated once again and the feeding assemblies are pivoted back into their feeding position and the feeding cycle is repeated.

While one advantageous embodiment has been chosen to illustrate the invention, it will be understood by those skilled in the art that various changes and modifications can be made therein without departing from the scope of the invention as defined in the appended claims.

What is claimed is:

1. A spirally wrapped, round bale transporter and feeder driven by a wheeled vehicle, the combination comprising:
   a support frame having first and second ends and including a pair of fixedly spaced, parallel bale-supporting rails;
   means, located adjacent said second end of said support frame, for coupling said frame to the vehicle;
   a plurality of wheels;
   means for coupling said wheels to said support frame for supporting said support frame;
   power means, coupled to said means for coupling said wheels to said support frame, for raising and lowering said support frame relative to said wheels to load bales onto said frame and unload bales from said frame; and
   feeding means, coupled to said support frame adjacent said second end, for spirally unwrapping and feeding a round bale supported on said bale-supporting rails adjacent said second end transversely of said frame, over one of said rails and onto the ground,
   said feeding means comprising
   at least one endless conveyor,
   means for pivotally coupling said endless conveyor to said support frame for pivotal movement about an axis parallel to the longitudinal axes of said bale-supporting rails and for moving said endless conveyor between a stowed position outboard of one of said bale-supporting rails and a feeding position inboard of one of said bale-supporting rails.

2. A transporter and feeder according to claim 1, wherein
   said means for coupling said frame to the vehicle comprises means for pivotally coupling said frame to the vehicle.

3. A transporter and feeder according to claim 2, wherein
   said means for coupling further comprises power means, coupled to said means for pivotally coupling, for raising and lowering said support frame second end relative to the vehicle.

4. A transporter and feeder according to claim 1, wherein
   said means for coupling said wheels to said support frame is substantially centrally located between said first and second ends of said support frame.

5. A transporter and feeder according to claim 1, wherein
   said means for coupling said wheels to said support frame comprises means for pivotally coupling said wheels to said support frame.

6. A transporter and feeder according to claim 1, wherein
   said power means comprises a pair of hydraulic power devices coupled to said frame and to said means for coupling said wheels to said support frame.

7. A transporter and feeder according to claim 1, wherein
   said endless conveyor has bale-gripping devices thereon.

8. A transporter and feeder according to claim 1, wherein
   said feeding means further comprises a second endless conveyor, and means for pivotally coupling said second endless conveyor to said support frame for pivotal movement about an axis parallel to the longitudinal axes of said bale-supporting rails and for moving said second endless conveyor between a stowed position outboard of said bale-supporting rails and a feeding position inboard of said bale-supporting rails.

9. A spirally wrapped, round bale transporter and feeder driven by a wheeled vehicle, the combination comprising:
   a support frame having first and second ends and including a pair of spaced, parallel bale-supporting members;
   means, located adjacent said second end of said support frame, for coupling said frame to the vehicle;
   a plurality of wheels;
   means for coupling said wheels to said support frame;
   power means, coupled to said means for coupling said wheels to said support frame, for raising and lowering said support frame relative to said wheels to load bales onto said frame and unload bales from said frame; and feeding means, coupled to said support frame adjacent said second end, for spirally unwrapped and feeding a round bale supported on said bale-supporting members adjacent said second end transversely of said frame and onto the ground, said feeding means comprising a pair of endless conveyor means, each having bale-gripping devices thereon, said feeding means further comprising means for pivotally coupling said pair of endless conveyor means to said support frame and for moving said pair of endless conveyor means between a stowed position outboard of said bale-supporting members and a feeding position inboard of said bale-supporting members, said bale-supporting members being a pair of rails, and said means for pivotally coupling said pair of endless conveyor means to said support frame pivotally coupling said pair of endless conveyor means along the longitudinal axes of said rails.

10. A transporter and feeder according to claim 8, wherein said means for pivotally coupling and for moving said pair of endless conveyors comprises a hydraulic power device.

11. A spirally wrapped, round bale transporter and feeder driven by a wheeled vehicle, the combination comprising:

a support frame having first and second ends and including a pair of spaced, parallel bale-supporting members;

means, located adjacent said second end of said support frame, for coupling said frame to the vehicle;

a plurality of wheels;

means for coupling said wheels to said support frame;

power means, coupled to said means for coupling said wheels to said support frame, for raising and lowering said support frame relative to said wheels to load bales onto said frame and unload bales from said frame; and feeding means, coupled to said support frame adjacent said second end, for spirally unwrapping and feeding a round bale supported on said bale-supporting members adjacent said second end transversely of said frame and onto the ground, said feeding means comprising a pair of endless conveyor means, each having bale-gripping devices thereon, said feeding means further comprising means for pivotally coupling said pair of endless conveyor means to said support frame and for moving said pair of endless conveyor means between a stowed position outboard of said bale-supporting members and a feeding position inboard of said bale-supporting members, said means for pivotally coupling and for moving said pair of endless conveyor means comprising a hydraulic power device, said means for pivotally coupling and for moving said pair of endless conveyor means further comprising
a pair of sprockets, each rigidly coupled to one of said pair of endless conveyor means,
a chain interconnecting said pair of sprockets, and
means for coupling said hydraulic power device to said chain.

12. A spirally wrapped, round bale transporter and feeder driven by a wheeled vehicle, the combination comprising:

a support frame having first and second ends and including a pair of fixedly spaced, parallel bale-supporting rails;

means, located adjacent said second end of said support frame, for coupling said frame to the vehicle;

a plurality of wheels;

means for coupling said wheels to said support frame for supporting said support frame;

power means, coupled to said means for coupling said wheels to said support frame, for raising and lowering said support frame relative to said wheels to load bales onto said frame and unload bales from said frame; and feeding means, coupled to said support frame adjacent said second end, for spirally unwrapping and feeding a round bale supported on said bale-supporting rails adjacent said second end transversely of said frame and onto the ground, said feeding means comprising
a first endless conveying means having a bale-engaging conveying surface and being coupled to one of said rails,
a second endless conveying means having a bale-engaging conveying surface and being coupled to the other of said rails,
said endless conveying surfaces moving transversely of the longitudinal axes of said rails, each of said endless conveying means having a rotating drive shaft extending parallel to the longitudinal axes of said rails.

13. A transporter and feeder according to claim 12, wherein each of said endless conveying surfaces extends around the longitudinal axis of one of said rails.

* * * * *